US012416893B2

(12) United States Patent
Nagashima

(10) Patent No.: US 12,416,893 B2
(45) Date of Patent: Sep. 16, 2025

(54) IMAGE FORMING APPARATUS

(71) Applicant: KYOCERA Document Solutions Inc., Osaka (JP)

(72) Inventor: Teruhiko Nagashima, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/786,063

(22) Filed: Jul. 26, 2024

(65) Prior Publication Data

US 2025/0044732 A1 Feb. 6, 2025

(30) Foreign Application Priority Data

Aug. 4, 2023 (JP) ................................ 2023-127510

(51) Int. Cl.
*G03G 15/00* (2006.01)
*G03G 15/08* (2006.01)

(52) U.S. Cl.
CPC ......... *G03G 15/80* (2013.01); *G03G 15/0872* (2013.01)

(58) Field of Classification Search
CPC . G03G 15/0872; G03G 15/0886; G03G 15/80
USPC .................................. 399/90, 107, 108, 110
See application file for complete search history.

(56) References Cited

U.S. PATENT DOCUMENTS 9,983,513 B2 * 5/2018 Nagashima ........ G03G 15/0898

FOREIGN PATENT DOCUMENTS

JP 2005-163155 A 6/2005

* cited by examiner

*Primary Examiner* — Hoan H Tran
(74) *Attorney, Agent, or Firm* — Stein IP, LLC

(57) ABSTRACT

The image forming apparatus includes an image carrier, a developing unit, and a housing. The developing unit includes a toner carrier, a development container, a circuit board, and a board retaining portion. The development container rotatably supports both end portions of a rotating shaft of the toner carrier, and contains developer and the toner carrier. The development container includes a protrusive support portion which protrudes from both end portions of an axial direction and which is pivotably supported by a retaining frame. The development container is pivoted on the protrusive support portion serving as a fulcrum, and the toner carrier is reciprocatively movable so as to come into contact with or separate farther from the image carrier. The board retaining portion is pivotably supported on a fulcrum given by a retention support portion coaxial with the protrusive support portion, and is independent of the reciprocative movement of the development container.

6 Claims, 12 Drawing Sheets

IMAGE FORMING APPARATUS

INCORPORATION BY REFERENCE

This application is based on and claims the benefit of priority from Japanese Patent Application No. 2023-127510 filed on Aug. 4, 2023, the contents of which are hereby incorporated by reference.

BACKGROUND

The present disclosure relates to an image forming apparatus.

A conventional image forming apparatus includes an image carrier, a developing unit, and a housing. The image carrier is subjected to formation of an electrostatic latent image on its surface. The developing unit feeds developer onto the surface of the image carrier, and develops the electrostatic latent image to form a toner image. The housing houses the image carrier and the developing unit therein.

The developing unit includes a toner carrier, a development container, and a circuit board. The toner carrier, placed opposite to the image carrier, carries toner to be fed to the surface of the image carrier. The development container rotatably supports both end portions of a rotating shaft of the toner carrier, and also contains the toner and the toner carrier therein. The circuit board is placed at axial one end portion of the development container.

The developing unit is fitted within the housing, by which the circuit board is connected to a connecting terminal on the housing side.

With the prior art adopted, in a case where the developer consists of nonmagnetic one-component toner, the development container is pivoted on a container support portion serving as a fulcrum so that the toner carrier is reciprocatively moved in a contacting/separating direction relative to the image carrier. In this case, there has been a possibility that the circuit board may be pivoted in conjunction with the development container, resulting in a noncontact state between the circuit board and the connecting terminal.

In view of the above-described problems, an object of the present disclosure is to provide an image forming apparatus capable of maintaining a stable contact between the circuit board and the connecting terminal.

SUMMARY

An image forming apparatus according to one aspect of the present disclosure includes an image carrier, a developing unit, and a housing. The image carrier has an electrostatic latent image formed on its surface. The developing unit feeds nonmagnetic one-component developer to the surface of the image carrier and develops the electrostatic latent image to form a toner image. The housing contains the image carrier and the developing unit. The developing unit includes a toner carrier, a development container, a circuit board, and a board retaining portion. The toner carrier is placed opposite the image carrier, and carries the developer to be fed to the surface of the image carrier. The development container rotatably supports both end portions of a rotating shaft of the toner carrier, and contains the developer and the toner carrier. The circuit board is placed in adjacency to axial one side of the development container. The board retaining portion retains the circuit board. The housing includes one pair of retaining frames, and a terminal holder. The retaining frames retain the development container and the image carrier from both sides of an axial direction. The terminal holder is placed above the retaining frames, and is vertically opposed to the circuit board at one end portion of the axial direction of the development container. The terminal holder includes a connecting terminal, and an elastic member. The connecting terminal is set in contact with the circuit board. The elastic member presses the connecting terminal toward the circuit board. The development container includes a protrusive support portion which protrudes from axial both end portions and which is pivotably supported by the retaining frames. The development container is pivoted on the protrusive support portion serving as a fulcrum, and the toner carrier is reciprocatively movable in such a direction as to come into contact with or separate farther from the image carrier. The board retaining portion is pivotably supported on a fulcrum given by a retention support portion coaxial with the protrusive support portion, and is independent of the reciprocative movement of the development container.

Still further objects of the disclosure as well as concrete advantages obtained by the disclosure will become more apparent from embodiments thereof described hereinbelow.

DETAILED DESCRIPTION (1. General Configuration of Image Forming Apparatus)

Figure 1:
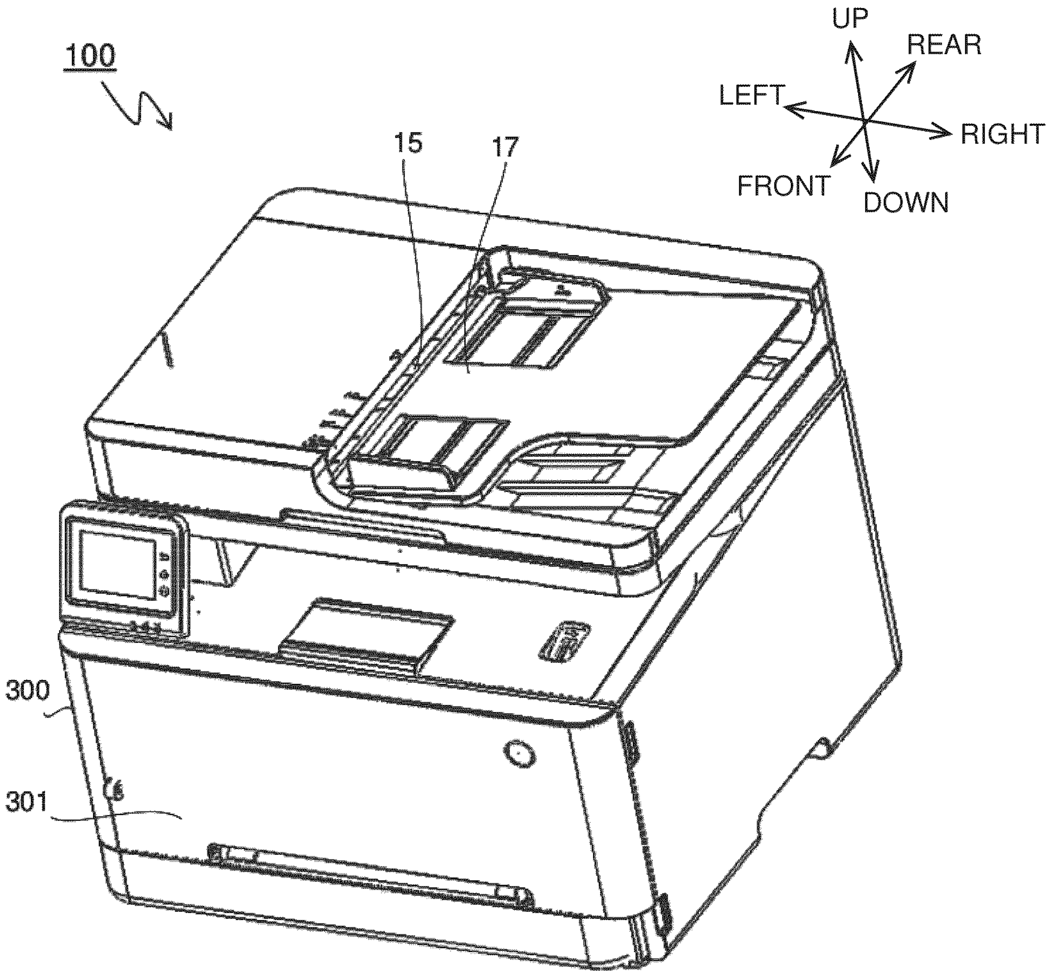
FIG. 1 is a perspective view of an image forming apparatus 100 according to an embodiment of the present disclosure.
Figure 2:
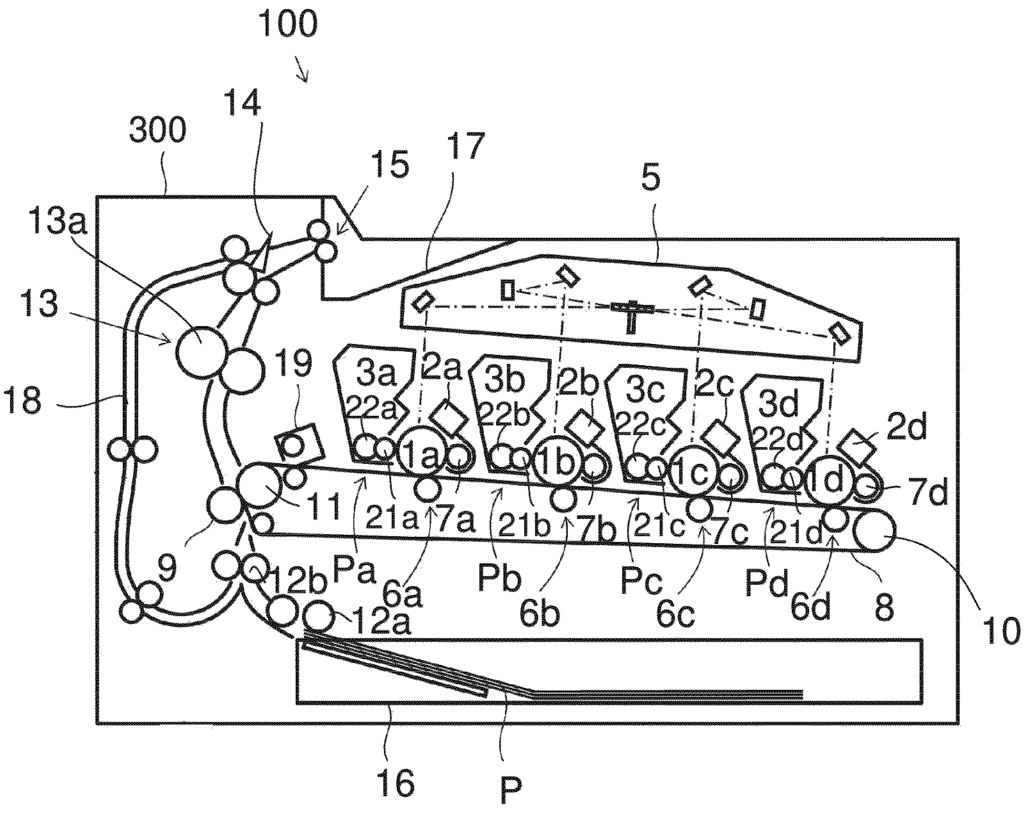
FIG. 2 is a side sectional view showing an internal configuration of the image forming apparatus 100 according to the embodiment of the disclosure.

Hereinafter, an embodiment of the present disclosure will be described with reference to the accompanying drawings. FIG. 1 is a perspective view of an image forming apparatus 100 according to an embodiment of the disclosure. FIG. 2 is a side sectional view showing an internal structure of the image forming apparatus 100. It is noted that positioning of the internal structure of the image forming apparatus 100 in FIG. 2 is not limitative in terms of positional relationships of the disclosure.

The image forming apparatus 100 includes photosensitive drums (image carriers) la to 1*d*, developing units 3*a* to 3*d*, and a housing 300. The housing 300 constitutes a shell of the image forming apparatus 100, internally accommodating the photosensitive drums (image carriers) la to 1*d*, and the developing units 3*a* to 3*d*.

In a main body of the image forming apparatus 100 (color printer in this case), four image forming parts Pa, Pb, Pc, Pd are disposed in this order starting from an upstream side (left side in FIG. 1) of a conveyance direction. These image forming parts Pa to Pd, which are provided in correspondence to images of different four colors (yellow, cyan, magenta and black), form images of yellow, cyan, magenta and black successively each through processes of charging, exposure to light, development and transfer.

The image forming parts Pa to Pd include photosensitive drums (image carriers) la to 1*d*, charging units 2*a* to 2*d*, an exposure unit 5, developing units 3*a* to 3*d*, and cleaning units 7*a* to 7*d*, respectively. The photosensitive drums (image carriers) 1*a* to 1*d* for carrying visible images (toner images) of individual colors, respectively, are disposed in the image forming parts Pa to Pd, respectively, while an intermediate transfer belt (transfer-destination member) 8 is provided in adjacency to the image forming parts Pa to Pd.

Primary transfer rollers (transfer members) 6*a* to 6*d* are placed in opposition to the photosensitive drums (image carriers) 1*a* to 1*d*, respectively. By the primary transfer rollers 6*a* to 6*d*, individual-color visible images (toner images) formed on the photosensitive drums (image carriers) 1*a* to 1*d* with a specified transfer voltage applied thereto are transferred onto the intermediate transfer belt (transfer-destination member) 8. As a result of this, the toner images formed on the photosensitive drums 1*a* to 1*d* are primarily transferred, and superimposed one on another, successively onto the intermediate transfer belt 8 that is moving while keeping in contact with the photosensitive drums 1*a* to 1*d*.

Thereafter, the toner image primarily transferred onto the intermediate transfer belt 8 is secondarily transferred onto a transfer sheet P as an example of a recording medium by a secondary transfer roller 9. Further, the transfer sheet P to which the toner image has been secondarily transferred is subjected to fixation of the toner image in a fixing unit 13 and thereafter discharged from the main body of the image forming apparatus 100. In execution of the image forming process with the photosensitive drums 1*a* to 1*d*, the photosensitive drums 1*a* to 1*d* are each rotated counterclockwise in FIG. 2.

The transfer sheet P, to which the toner image is to be secondarily transferred, is contained in a sheet cassette 16 placed in lower part of the main body of the image forming apparatus 100. The transfer sheet P is conveyed via a feed roller 12*a* and a registration roller pair 12*b* to a nip portion between the secondary transfer roller 9 and a driving roller 11 of the intermediate transfer belt 8. The intermediate transfer belt 8 is mostly given by a seamless belt with use of a sheet of dielectric resin. Also, a blade-like belt cleaner 19 for eliminating toner or the like remaining on the surface of the intermediate transfer belt 8 is placed downstream of the secondary transfer roller 9.

Next, the image forming parts Pa to Pd will be described. Provided around and above the photosensitive drums (image carriers) 1*a* to 1*d* that are set up rotatable are charging units 2*a* to 2*d* for electrically charging the photosensitive drums 1*a* to 1*d*, respectively, an exposure unit 5 for exposing the photosensitive drums 1*a* to 1*d* to light of image information, developing units 3*a* to 3*d* for forming toner images on the photosensitive drums 1*a* to 1*d*, respectively, and cleaning units 7*a* to 7*d* for eliminating developer (toner) or the like remaining on the photosensitive drums 1*a* to 1*d*, respectively.

The exposure unit 5 exposes to light the photosensitive drums (image carriers) 1*a* to 1*d* that have been electrically charged by the charging units 2*a* to 2*d* to form electrostatic latent images, respectively.

The developing units 3*a* to 3*d* are placed in opposition to the photosensitive drums (image carriers) 1*a* to 1*d*, respectively, and include developing rollers (toner carriers) 21*a* to 21*d*, feed rollers 22*a* to 22*d*, and development containers 4*a* to 4*d*, respectively. The developing units 3*a* to 3*d* apply a specified development voltage to the developing rollers 21*a* to 21*d*, respectively, so that nonmagnetic one-component toner (developer) is deposited on the electrostatic latent images formed on the photosensitive drums 1*a* to 1*d*, respectively, to form a toner image. The developing rollers 21*a* to 21*d* are placed in opposition to the photosensitive drums (image carriers) 1*a* to 1*d*, respectively.

The development containers 4*a* to 4*d* have individual-color nonmagnetic one-component toner of yellow, cyan, magenta and black, respectively, contained therein. Placed inside the development containers 4*a* to 4*d* are developing rollers (toner carriers) 21*a* to 21*d*, feed rollers 22*a* to 22*d*, and stirring paddles (not shown), respectively. The stirring paddles stir the toner in the development containers 4*a* to 4*d*, respectively.

The feed rollers 22*a* to 22*d* are placed in opposition to the developing rollers 21*a* to 21*d*, respectively. The feed rollers 22*a* to 22*d* hold, on their outer circumferential surfaces, the toner contained in the development containers 4*a* to 4*d*, respectively. Also, the feed rollers 22*a* to 22*d* feed the developer held on the outer circumferential surfaces to the developing rollers 21*a* to 21*d*, respectively. In order to move the toner from the feed rollers 22*a* to 22*d* to the developing rollers 21*a* to 21*d*, respectively, a specified feed voltage (DC voltage) is applied to the feed rollers 22*a* to 22*d*.

Upon input of image data from a higher-order device such as a personal computer, first, the surfaces of the photosensitive drums 1*a* to 1*d* are electrically charged uniformly by the charging units 2*a* to 2*d*, respectively. Next, light emission corresponding to the image data is executed by the exposure unit 5, so that electrostatic latent images corresponding to the image data are formed on the photosensitive drums 1*a* to 1*d*, respectively. The developing units 3*a* to 3*d* have been filled with specified quantities of developer including individual-color toner of yellow, cyan, magenta and black, respectively. The toner in the developer is fed by the developing units 3*a* to 3*d* onto the photosensitive drums 1*a* to 1*d*, respectively, so as to be electrostatically deposited thereon. As a result of this, toner images corresponding to the electrostatic latent images formed by the exposure from the exposure unit 5 are formed. In this embodiment, the developer is a nonmagnetic one-component developer.

Then, by the primary transfer rollers 6*a* to 6*d*, electric fields are imparted at a specified transfer voltage to between the primary transfer rollers 6*a* to 6*d* and the photosensitive drums 1*a* to 1*d*, respectively, so that the toner images of yellow, cyan, magenta and black on the photosensitive drums 1*a* to 1*d* are primarily transferred onto the intermediate transfer belt 8. These four-color images are formed with specified positional relationships which are previously determined for specified full-color image formation. Thereafter, in preparation for subsequent formation of new electrostatic latent images, toner or the like remaining on the surfaces of the photosensitive drums 1*a* to 1*d* after the primary transfer is eliminated by the cleaning units 7*a* to 7*d*.

The intermediate transfer belt 8 is stretched over on an upstream-side driven roller 10 and a downstream-side driving roller 11. When the intermediate transfer belt 8 has started to turn clockwise along with rotation of the driving roller 11 driven by a drive motor (not shown), the transfer sheet P is conveyed at a specified timing from the registration roller pair 12*b* to a nip portion (secondary transfer nip portion) between the driving roller 11 and the secondary transfer roller 9 provided in adjacency to the driving roller 11, so that the full-color image on the intermediate transfer belt 8 is secondarily transferred onto the transfer sheet P. The transfer sheet P to which the toner image has been secondarily transferred is conveyed to the fixing unit 13.

The transfer sheet P conveyed to the fixing unit 13 is heated and pressurized by a fixing roller pair 13*a* so that the toner image is fixed on the surface of the transfer sheet P, with a specified full-color image formed. The transfer sheet P with the full-color image formed thereon is assorted in conveyance direction by a branching part 14 that branches into a plurality of directions, and the transfer sheet P is discharged, as it is (or after fed to a double-sided conveyance path 18 and subjected to double-sided image formation), to a discharge tray 17 by a discharge roller pair 15.

(2. Configuration of Drum Unit)

Figure 3:
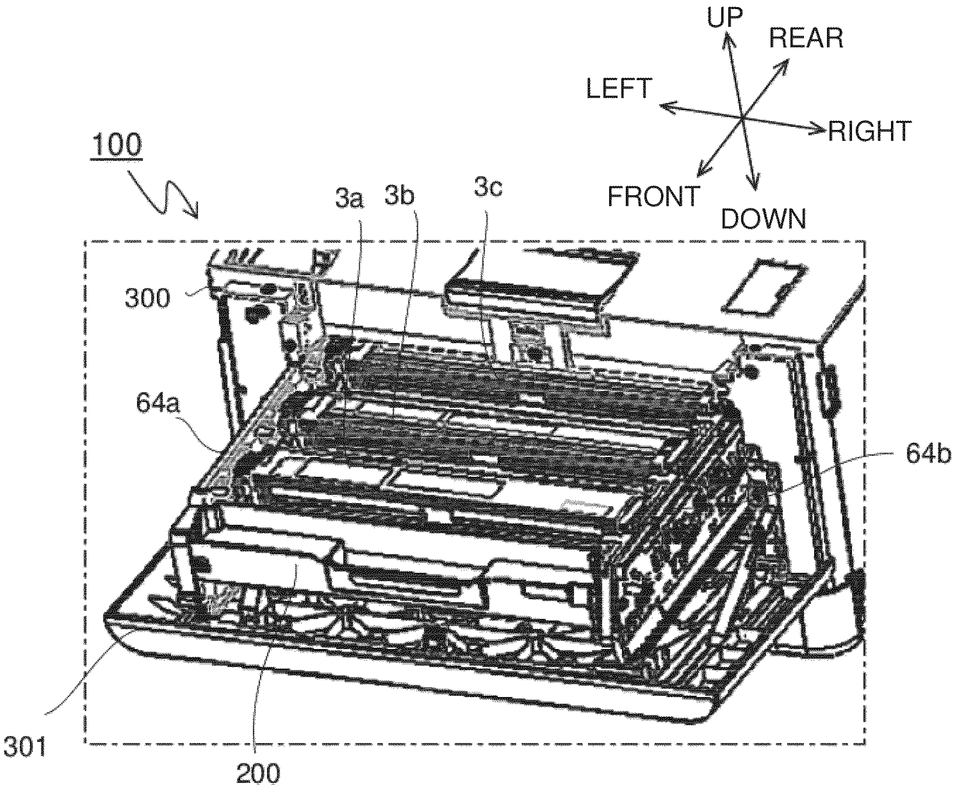
FIG. 3 is a perspective view showing part of the image forming apparatus 100.
Figure 4:
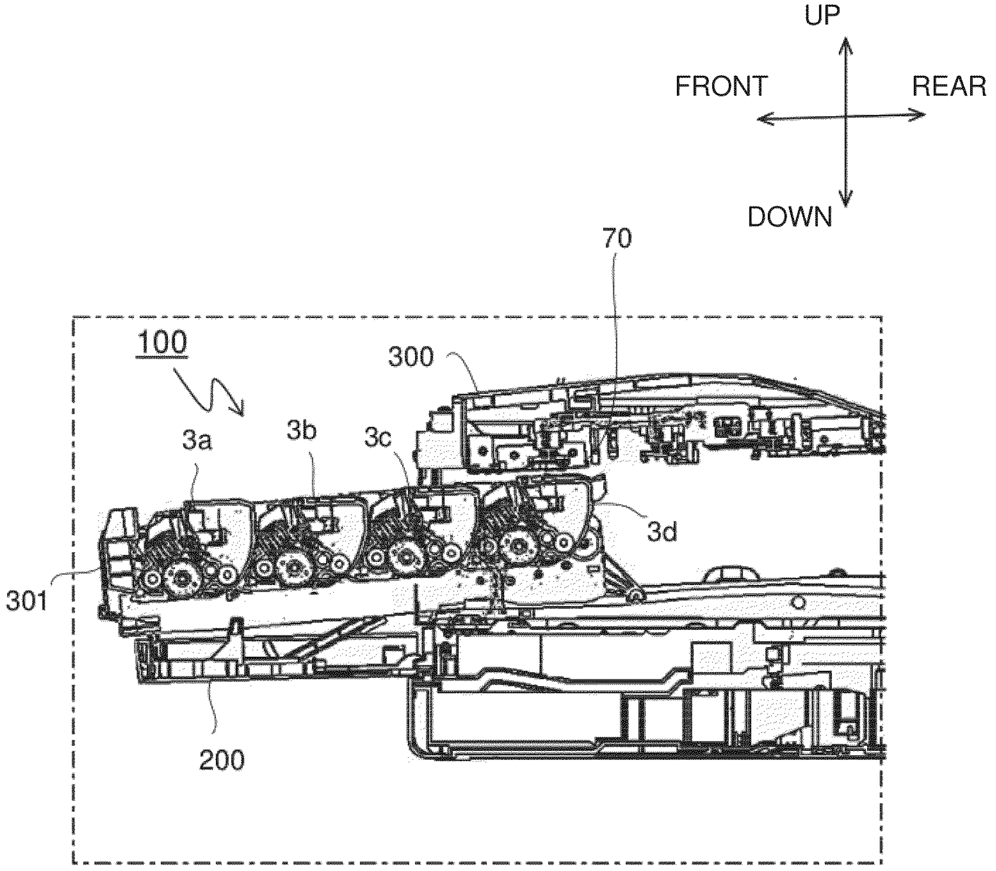
FIG. 4 is a side sectional view showing part of the image forming apparatus 100.
Figure 5:
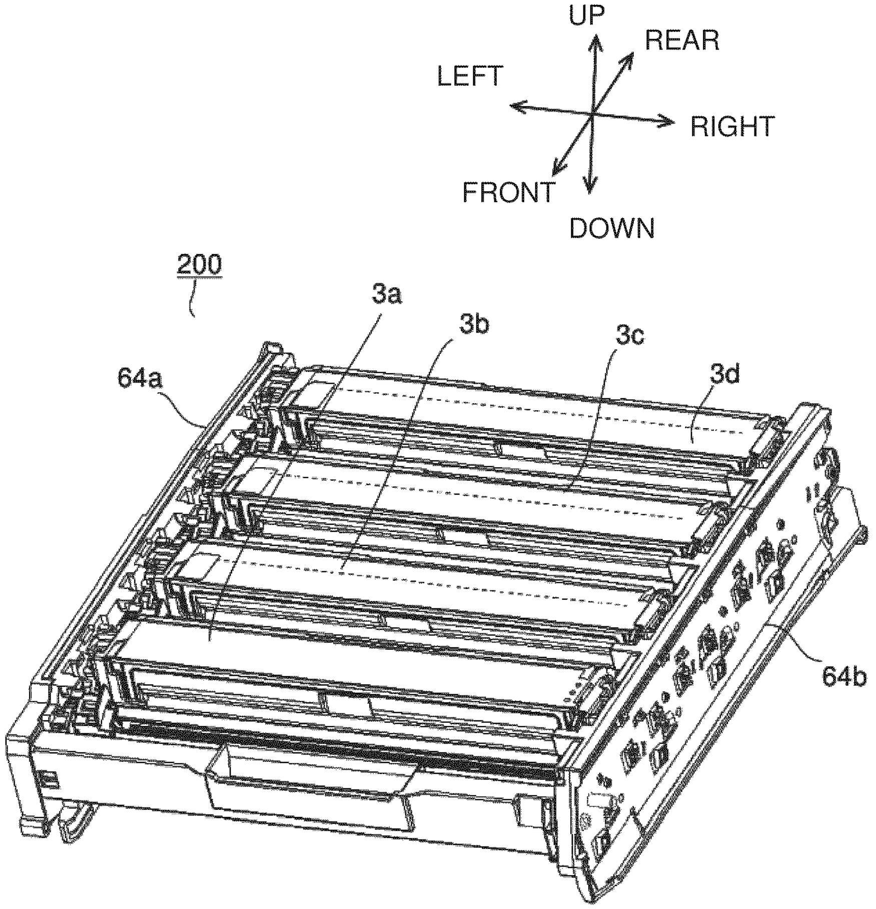
FIG. 5 is a perspective view showing a drum unit 200 to be mounted on the image forming apparatus 100.
Figure 6:
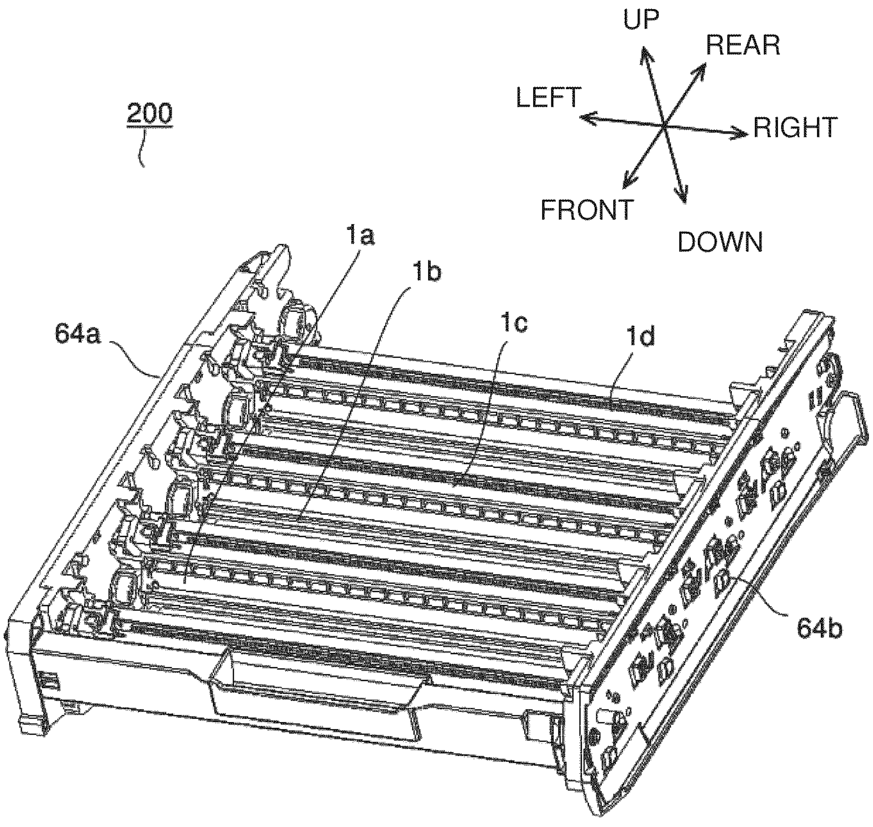
FIG. 6 is a perspective view showing the drum unit 200 to be mounted on the image forming apparatus 100.

FIG. 3 is a perspective view showing part of the image forming apparatus 100. FIG. 4 is a side sectional view showing part of the image forming apparatus 100. FIGS. 3 and 4 show a state in which the drum unit 200 is exposed with the housing 300 partly removed from the image forming apparatus 100. FIGS. 5 and 6 are perspective views of the drum unit 200. FIG. 5 shows a state in which the developing units 3*a* to 3*d* have been set up, and FIG. 6 shows a state in which the developing units 3*a* to 3*d* have been removed.

In the image forming apparatus 100, pulling out a front cover 301, which is placed at a front of the housing 300, causes the drum unit 200 to be exposed. In this state, a user is allowed to take out the developing units 3*a* to 3*d* supported by the drum unit 200.

The drum unit 200 includes the photosensitive drums (image carriers) 1*a* to 1*d*, the developing units 3*a* to 3*d*, the charging units 2*a* to 2*d*, the exposure unit 5, retaining frames 64*a*, 64*b*, the cleaning units 7*a* to 7*d*, and a terminal holder 70.

When the developing units 3*a* to 3*d* have become empty of contained developer, the developing units 3*a* to 3*d* can be replaced with other developing units 3*a* to 3*d* filled with the developer. Also, the developing units 3*a* to 3*d* are removed, as needed, for maintenance of interior of the image forming apparatus 100. In this embodiment, the developing units 3*a* to 3*d* are fittably-and-removably supported on the housing 300.

The retaining frames 64*a*, 64*b* are part of the housing 300, and the drum unit 200 is fixed to the housing 300 via the retaining frames 64*a*, 64*b*. That is, the housing 300 includes the retaining frames 64*a*, 64*b*.

The retaining frames 64*a*, 64*b* are metallic plate-shaped members extending in a front/rear direction, and provided in one pair with the photosensitive drums (image carriers) 1*a* to 1*d* and the developing units 3*a* to 3*d* both interposed in a left/right direction between the retaining frames 64*a*, 64*b*. In this case, the photosensitive drums 1*a* to 1*d* and the developing units 3*a* to 3*d* are arrayed alternately in the front/rear direction.

The terminal holder 70 is movable vertically, i.e. in an up/down direction, via a driving unit (not shown). When the front cover 301 is pulled out forward, the terminal holder 70 is moved upward so as to become farther from the drum unit 200. Conversely, when the front cover 301 is pushed in rearward so as to be fitted to the housing 300, the terminal holder 70 is moved downward so as to become closer to the drum unit 200.

Figure 7:
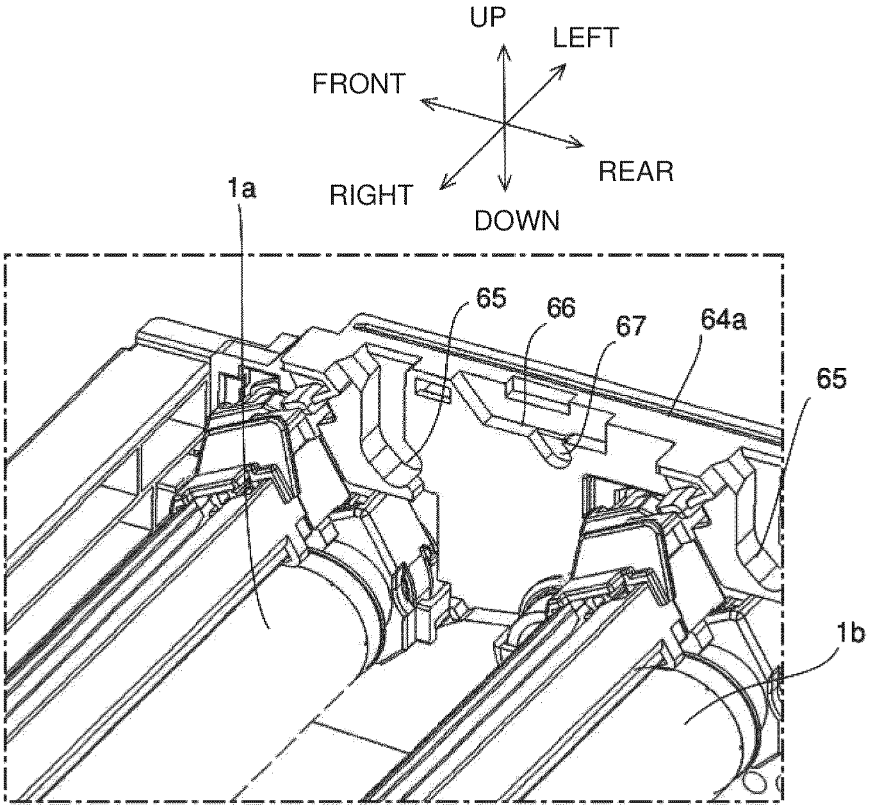
FIG. 7 is a perspective view showing, in enlargement, part of a retaining frame 64*a* to be mounted on the image forming apparatus 100.
Figure 8:
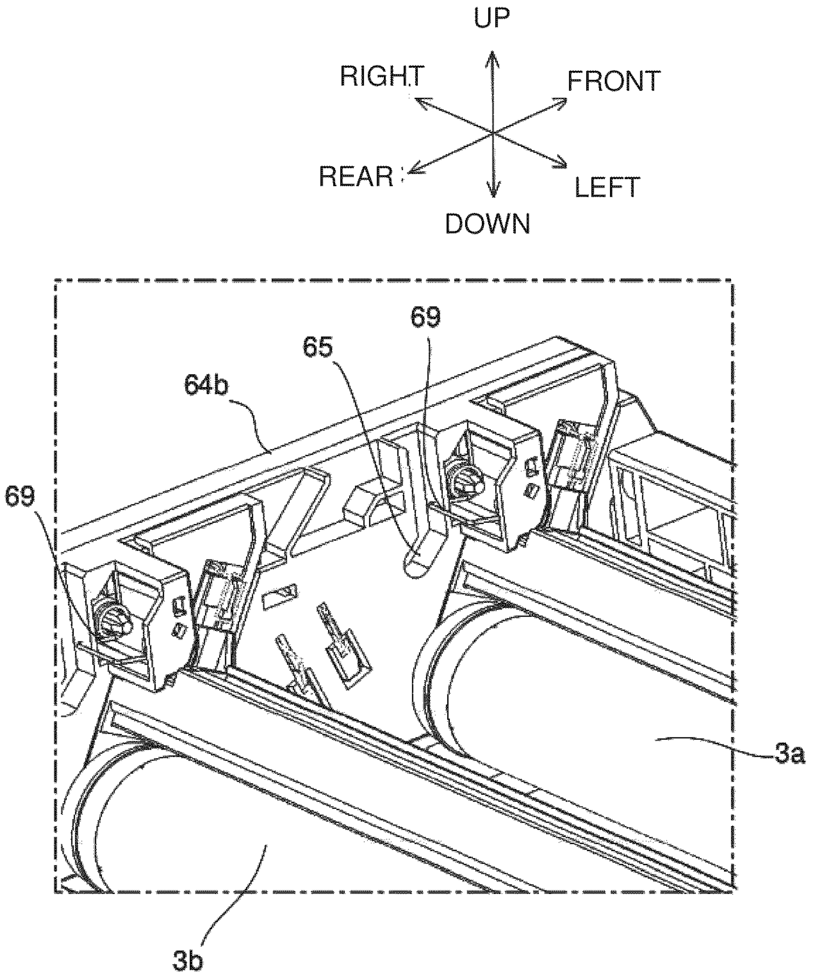
FIG. 8 is a perspective view showing, in enlargement, part of a retaining frame 64*b* to be mounted on the image forming apparatus 100.

FIG. 7 is a perspective view showing, in enlargement, part of the retaining frame 64*a*. FIG. 8 is a perspective view showing, in enlargement, part of the retaining frame 64*b*. The pair of retaining frames 64*a*, 64*b* each have guide portions 65, board recesses 66, and restrictive recesses 67.

The guide portions 65 are placed on inner surfaces of the retaining frames 64*a*, 64*b*, respectively, opposed to each other in the left/right direction. The guide portions 65 are placed at four places in each of the retaining frames 64*a*, 64*b* so as to be arrayed with specified intervals in the front/rear direction. During course of fitting the developing units 3*a* to 3*d* to the drum unit 200, the guide portions 65 guide the developing units 3*a* to 3*d* to their specified fitting positions. In this embodiment, the guide portions 65 are recesses formed in the inner surfaces of the retaining frames 64*a*, 64*b*, respectively, with their upper end faces opened. Also, each guide portion 65 has its upper end portion extending downward linearly and its lower end portion bent in a direction of further separating from the photosensitive drum 1*a*. In this embodiment, the lower end portion of each guide portion 65 has rearward inclination that increases more and more in a downward direction.

Each board recess 66 is formed so as to be recessed downward from an upper surface of the retaining frame 64*a*, with a later-described circuit board 330 partly placed inside the board recess 66. The board recess 66 is placed at four places arrayed in the front/rear direction, where the board recesses 66 are, in this embodiment, placed in rearward adjacency to the guide portions 65, respectively.

Each restrictive recess 67 is formed by a bottom surface of the board recess 66 being partly recessed downward. The restrictive recess 67, in which a later-described restrictive protrusion 324 is to be placed, differs in shape in response to the restrictive protrusion 324 placed therein. As a result, any one of the developing units 3*a* to 3*d*, whichever it is incompatible with a restrictive recess 67, is prevented from being fitted, thus the restrictive recess 67 serving for color-incompatibility function.

Figure 9:
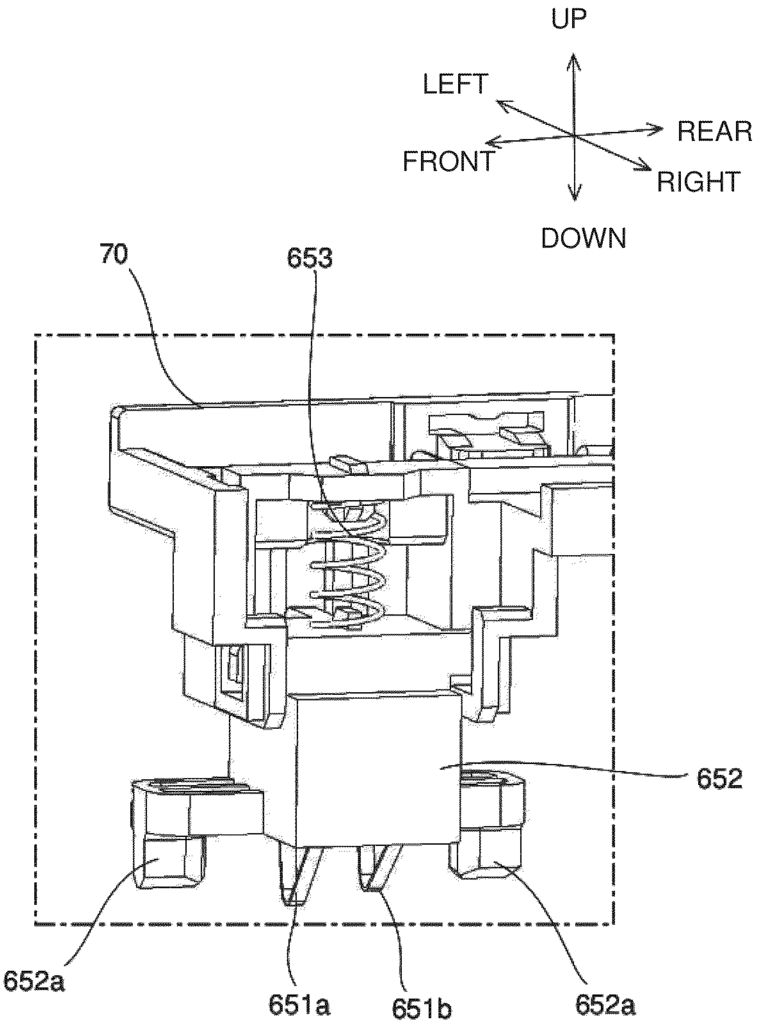
FIG. 9 is a perspective view showing, in enlargement, part of a terminal holder 70 to be mounted on the image forming apparatus 100.

FIG. 9 is a perspective view showing, in enlargement, part of the terminal holder 70. The terminal holder 70, forming part of the housing 300, is fixed to the housing 300 so as to be movable vertically, i.e., in the up/down direction. That is, the housing 300 includes the terminal holder 70. More specifically, the terminal holder 70, extending in the front/rear direction, is movable in the up/down direction above the retaining frame 64*a* placed on the left side (axial one side).

The terminal holder 70 includes a plurality of connecting terminals 651*a*, 651*b*, a terminal retaining portion 652, and a coil spring (elastic member) 653. As the connecting terminals 651*a*, 651*b*, the terminal retaining portion 652 and the coil spring (elastic member) 653 are assumed as one set, four sets of these members are placed so as to be arrayed in the front/rear direction in correspondence to the developing units 3*a* to 3*d*, respectively.

The terminal retaining portion 652 retains the connecting terminals 651*a*, 651*b* at lower end portions, respectively, and also has a pair of board pressing pieces 652*a* protruding downward from a lower face of the terminal retaining portion 652. The connecting terminals 651*a*, 651*b* are placed between a pair of board pressing pieces 652*a*. The pair of board pressing pieces 652*a* are so positioned that their lower ends become higher than lower ends of the connecting terminals 651*a*, 651*b*.

When the terminal holder 70 is moved downward so as to be close to the drum unit 200, the connecting terminals 651*a*, 651*b* are brought into contact, and connected, with an upper face of a later-described circuit board 330. The connecting terminals 651*a*, 651*b* are biased downward via the coil spring 653 that presses downward an upper face of the terminal retaining portion 652. That is, the coil spring (elastic member) 653 presses the connecting terminals 651*a*, 651*b* toward the circuit board 330.

The connecting terminals 651*a*, 651*b* biased downward are brought into contact, and deformed, with the circuit board 330. As a result, the circuit board 330 and the connecting terminals 651*a*, 651*b* come into a stably contactable state. In this case, the board pressing pieces 652*a* are brought into contact with the circuit board 330, so that the upper face of the circuit board 330 and the lower face of the terminal retaining portion 652 are kept constant in vertical distance therebetween. Thus, the circuit board 330 and the connecting terminals 651*a*, 651*b* come into a more stably contactable state therebetween.

The connecting terminals 651*a*, 651*b* are elastically deformable and moreover different therebetween in lower end position in the vertical direction, i.e. up/down direction. In this embodiment, the lower end of the connecting terminal 651*a* is positioned lower than the lower end of the connecting terminal 651*b*. Also, the connecting terminal 651*a* is assumed as a grounding-dedicated terminal, and the connecting terminal 651*b* is assumed as an electrical conduction- and signal-dedicated terminal. With this assumption, when the terminal holder 70 has moved downward so as to be close to the drum unit 200, the connecting terminal 651*a* comes into contact with the circuit board 330 earlier than the connecting terminal 651*b*. Therefore, in replacement of the circuit board 330, the circuit board 330 can be protected from a hot-swapping state and thereby prevented from being damaged.

By the connecting terminals 651*a*, 651*b* being connected to the circuit board 330, the developing unit 3*a* is electrically connected to a main control unit (not shown) consisting of a CPU and the like for controlling individual units of the image forming apparatus 100.

(3. Configuration of Set-and-Removal Mechanism for Developing Unit)

Figure 10:
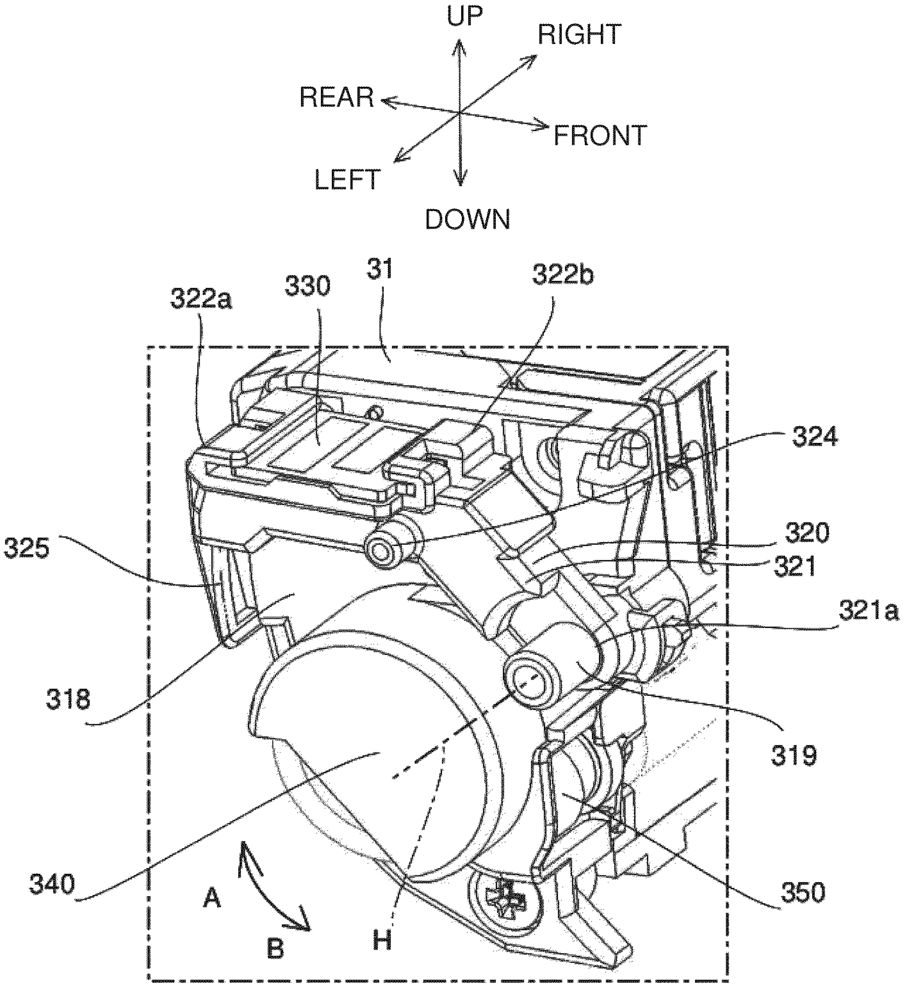
FIG. 10 is a perspective view showing, in enlargement, part of an end portion of a developing unit 3*a* to be mounted on the image forming apparatus 100.
Figure 11:
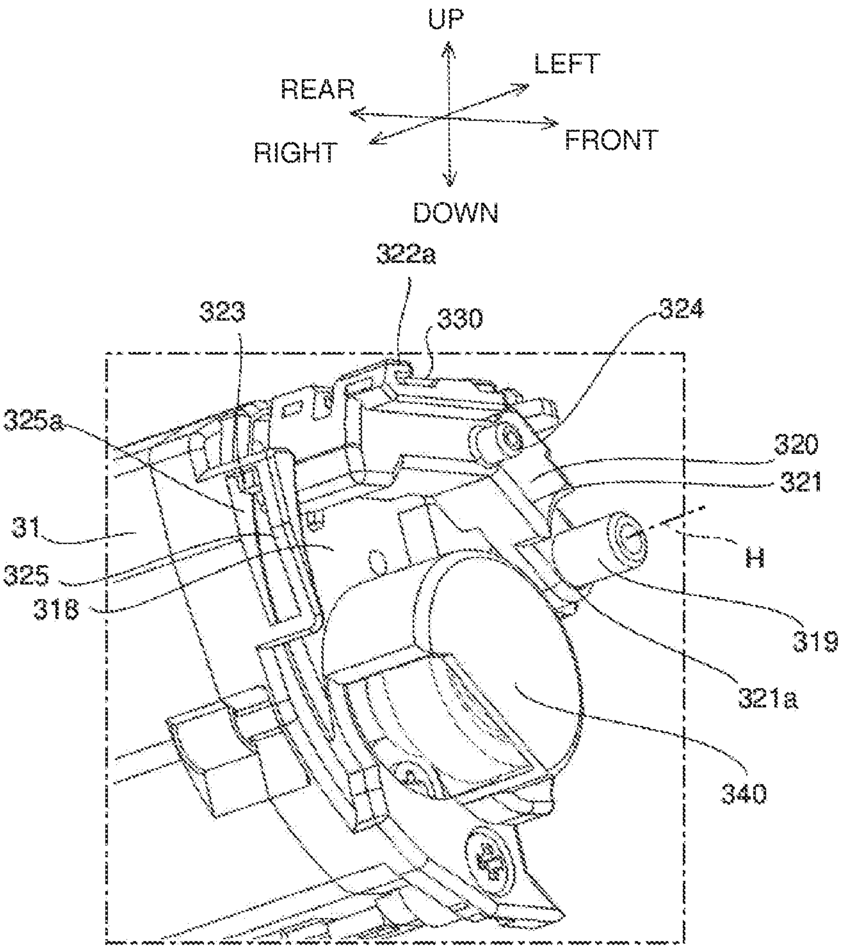
FIG. 11 is a perspective view showing, in enlargement, an end portion of the developing unit 3*a* to be mounted on the image forming apparatus 100.

FIGS. 10 and 11 are perspective views showing, in enlargement, a left-side (one-side) end portion of the developing unit 3*a*. Axial both side faces of the development container 31 are covered with side wall portions 318, respectively, where each side wall portion 318 includes bearing portions 340, 350 and a protrusive support portion 319. The bearing portion 340 rotatably supports a developing roller 32. The bearing portion 350 rotatably supports a feed roller 33. With this configuration, the developing roller 32 and the feed roller 33 are supported rotatable in the development container 31.

The protrusive support portions 319 protrude from side faces of both side wall portions 318 axially outward so as to be inserted into the above-described guide portions 65, respectively. The development container 31 is supported rotatable by the protrusive support portions 319.

Further, the circuit board 330 and a board retaining portion 320 for retaining the circuit board 330 are placed axially outside of the left-side (axial one-side) side wall portion 318 of the development container 31. That is, the circuit board 330 is placed in left-side (axial one-side) adjacency to the development container 31. The board retaining portion 320 has an arm portion 321, claw portions 322*a*, 322*b*, a retaining protrusion 323, and a restrictive protrusion 324.

The arm portion 321 extends radially from a pivotal shaft H while its fore end portion is bent circumferentially so as to be close to the developing roller 32. The fore end portion of the arm portion 321 has an upper face formed into a flat shape, where the circuit board 330 is placed.

At a pivotal shaft H-side end portion of the arm portion 321, a through hole 321*a* is formed so as to run through along the pivotal shaft H. The protrusive support portion 319 is inserted into the through hole 321*a*. As a result of this, the arm portion 321 is supported pivotable on the through hole (retention support portion) 321*a* serving as a fulcrum.

The claw portions 322*a*, 322*b* are bent upward from the upper face of the fore end portion of the arm portion 321 in such a direction as to approach each other. The circuit board 330 placed on the upper face of the fore end portion of the arm portion 321 is pinched and fixed between the claw portions 322*a*, 322*b* and the upper face of the fore end portion of the arm portion 321.

The retaining protrusion 323 is formed so as to protrude radially outward of the pivotal shaft H from the fore end portion of the arm portion 321. The retaining protrusion 323 is placed within a slit 325*a* which is formed in a protrusion guide portion 325 protruding axially from an outer circumferential edge of the side wall portion 318. The slit 325*a* extends circumferentially by running through the protrusion guide portion 325 along the radial direction of the pivotal shaft H. By the retaining protrusion 323 being moved along the slit 325*a*, the board retaining portion 320 is enabled to pivot stably without shifting in the axial direction of the pivotal shaft H.

The restrictive protrusions 324 are inserted into the above-described restrictive recesses 67, respectively. The restrictive protrusions 324 differ in shape among themselves depending on the developing units 3*a* to 3*d*. As a result of this, the developing units 3*a* to 3*d* can be prevented from being erroneously fitted to the photosensitive drums 1*a* to 1*d* corresponding to wrong colors.

Figure 12:
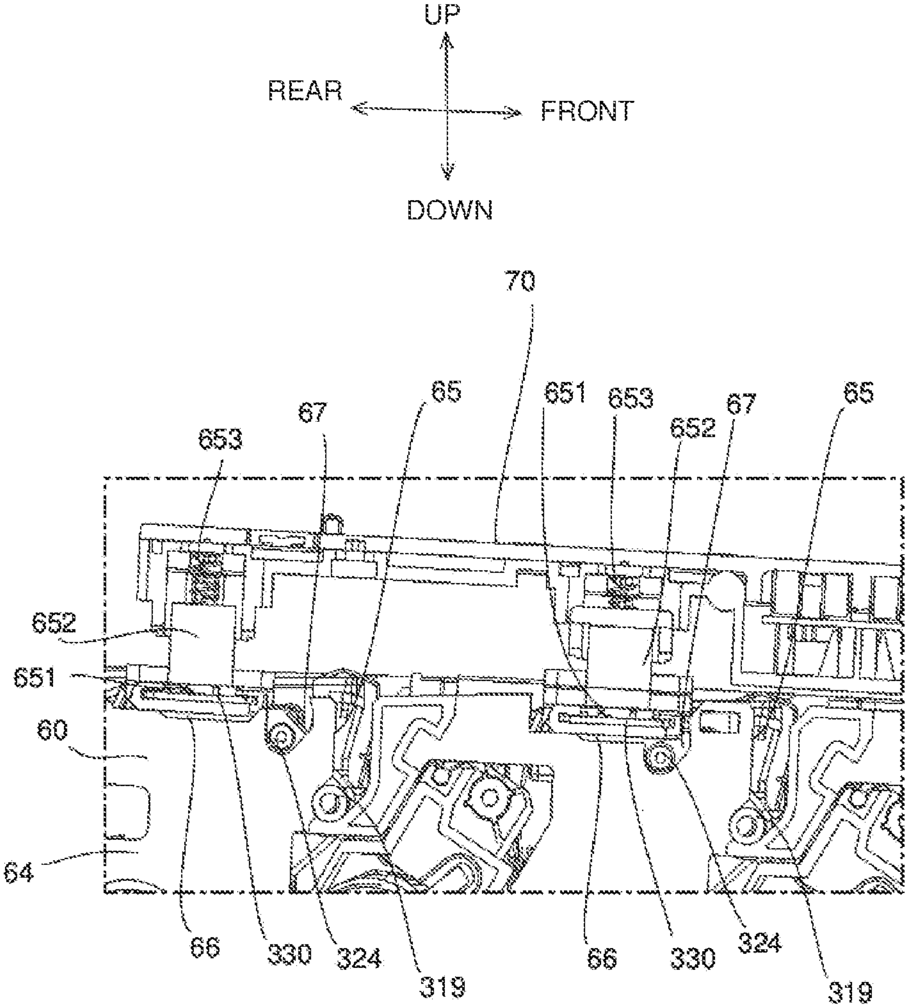
FIG. 12 is a side sectional view showing part of the developing unit 3*a* mounted on the image forming apparatus 100.

FIG. 12 is a side sectional view showing part of the developing unit 3*a* mounted on the image forming apparatus 100. The developing units 3*a* to 3*d* are guided along the individual guide portions 65 starting at opening upper ends of those guide portions 65, respectively. When the developing units 3*a* to 3*d* are guided up to their fitting positions that are terminal ends of the guide portions 65, respectively, the developing roller 32 is brought into contact with the photosensitive drums 1*a* to 1*d*.

Under this situation, out of the fore end portion of the arm portion 321, the upper end portion of the arm portion 321 with the circuit board 330 placed on its upper face is mounted on the board recess 66, and part of the circuit board 330 is placed within the board recess 66.

When the terminal holder 70 is moved downward so as to be close to the drum unit 200, the upper face of the circuit board 330 is pressed downward by the connecting terminals 651*a*, 651*b*. As a result of this, the board retaining portion 320 is pinched between the terminal holder 70 and the retaining frame so as to be held at a specified pivotal position. In this case, the circuit board 330 and the connecting terminals 651*a*, 651*b* are brought into contact with each other.

Meanwhile, the development container 31 is pressed by a pressing mechanism 36 (see FIG. 3) in such a direction as to become closer to the photosensitive drum 1*a*, and the development container 31 is pivoted in such a direction that the developing roller 32 becomes closer to the photosensitive drum 1*a* (A direction in FIG. 10). In this case, the board retaining portion 320 is supported pivotable on a fulcrum given by the through hole (retention support portion) 321*a* coaxial with the protrusive support portion 319, independently of reciprocative movement of the development container 31. As a result of this, the board retaining portion 320 is prevented from pivoting in conjunction with pivoting of the development container 31, so that the circuit board 330 and the connecting terminals 651*a*, 651*b* are held stably in contact with each other. Accordingly, there can be provided an image forming apparatus 100 capable of keeping a stable contact between the circuit board 330 and the connecting terminals 651*a*, 651*b*.

Also, in a case where the image forming apparatus 100 further includes a pivoting mechanism (not shown) capable of driving the development container 31 into pivotal motion, the development container 31 can be pivoted at an end of printing so as to make the developing roller 32 separate farther from the photosensitive drum 1*a*. In this case, the development container 31 is pivoted in such a direction as to make the developing roller 32 separate farther from the photosensitive drum 1*a* (B direction in FIG. 10). That is, the development container 31 is pivoted on the protrusive support portion 319 serving as a fulcrum, so that the developing roller 32 can be reciprocatively moved in such a direction as to become closer to or farther from the photosensitive drum 1*a*. In this case, the board retaining portion 320 is supported pivotable on the through hole (retention support portion) serving as a fulcrum and being coaxial with the protrusive support portion 319, independently of the reciprocative movement of the development container 31. As a result of this, the board retaining portion 320 can be prevented from being pivoted in conjunction with pivoting of the development container 31, so that the circuit board 330 and the connecting terminals 651*a*, 651*b* can be held in a stable contact state therebetween.

For instance, during monochromatic printing, the developing roller 32 of the developing unit 3*d* which has been filled with black developer is moved so as to be closer to the photosensitive drum 1*d*, while the developing rollers 32 of the developing units 3*a* to 3*c* which have been filled with developer of yellow, cyan, and magenta are moved so as to be farther from the photosensitive drums 1*a* to 1*c*, respectively. As a result of this, during monochromatic printing, the developing units 3*a* to 3*c* can be kept from being driven, so that drive time of the developing units 3*a* to 3*c* can be reduced. Also, the developing rollers 32 are separated farther from the photosensitive drums 1*a* to 1*c*, respectively, so that cleaning performance of the photosensitive drums 1*a* to 1*d* can be improved.

In addition, this disclosure is not limited only to the above-described embodiment and may be changed and modified in various ways unless those changes and modifications depart from the gist of the disclosure.

The disclosure is applicable to image forming apparatuses using nonmagnetic one-component developer containing toner.

What is claimed is:

1. An image forming apparatus comprising:

an image carrier on a surface of which an electrostatic latent image is to be formed;

a developing unit for feeding nonmagnetic one-component developer to the surface of the image carrier and developing the electrostatic latent image to form a toner image; and a housing for containing the image carrier and the developing unit, wherein the developing unit includes:

a toner carrier which is placed opposite the image carrier and which carries the developer to be fed to the surface of the image carrier;

a development container which rotatably supports both end portions of a rotating shaft of the toner carrier and which contains the developer and the toner carrier;

a circuit board which is placed in adjacency to axial one side of the development container; and a board retaining portion which retains the circuit board, and the housing includes:

one pair of retaining frames which retain the development container and the image carrier from both sides of an axial direction; and a terminal holder which is placed above the retaining frames and which is vertically opposed to the circuit board at one end portion of the axial direction of the development container, and the terminal holder includes:

a connecting terminal which is set in contact with the circuit board; and an elastic member which presses the connecting terminal toward the circuit board, and the development container includes a protrusive support portion which protrudes from axial both end portions and which is pivotably supported by the retaining frames, where the development container is pivoted on the protrusive support portion serving as a fulcrum, and the toner carrier is reciprocatively movable in such a direction as to come into contact with or separate farther from the image carrier, and the board retaining portion is pivotably supported on a fulcrum given by a retention support portion coaxial with the protrusive support portion, and is independent of the reciprocative movement of the development container.

2. The image forming apparatus according to claim 1, wherein the board retaining portion has, at one end portion, a through hole into which the protrusive support portion is inserted, and also has, on an upper face of the other end portion, an arm portion on which the circuit board is mounted.

3. The image forming apparatus according to claim 2, wherein a board recess which is formed by an upper face of the retaining frame being recessed downward, and in which part of the circuit board is placed; and a restrictive recess which is formed by part of a bottom face of the board recess being recessed downward, where the restrictive recess accommodates a restrictive protrusion protruding from the board retaining portion, and varies in shape in response to the restrictive protrusion placed therein.

4. The image forming apparatus according to claim 2, wherein the connecting terminal is elastically deformable and plurally provided and placed, and the connecting terminals differ in vertical lower-end position thereamong.

5. The image forming apparatus according to claim 1, wherein each retaining frame includes:

a board recess which is formed by an upper face of the retaining frame being recessed downward, and in which part of the circuit board is placed; and a restrictive recess which is formed by part of a bottom face of the board recess being recessed downward, where the restrictive recess accommodates a restrictive protrusion protruding from the board retaining portion, and varies in shape in response to the restrictive protrusion placed therein.

6. The image forming apparatus according to claim 1, wherein the connecting terminal is elastically deformable and plurally provided and placed, and the connecting terminals differ in vertical lower-end position thereamong.

* * * * *